United States Patent [19]

Grandjean

[11] Patent Number: 4,712,817

[45] Date of Patent: Dec. 15, 1987

[54] DOOR LATCH ASSEMBLY, IN PARTICULAR FOR AN AUTOMOBILE VEHICLE

[75] Inventor: Richard Grandjean, Saint Die, France

[73] Assignee: Compagnie Industrielle de Mecanismes en abrege C.I.M., France

[21] Appl. No.: 885,123

[22] Filed: Jul. 14, 1986

[30] Foreign Application Priority Data

Jul. 19, 1985 [FR] France .................. 85 11115

[51] Int. Cl.⁴ .................................... E05C 13/10
[52] U.S. Cl. ................... 292/336.3; 292/DIG. 53; 248/222.3
[58] Field of Search ............ 292/144, 201, 303, 336.3, 292/DIG. 53; 248/224.3, 222.3, 224.4, 217.2, 216.4

[56] References Cited

U.S. PATENT DOCUMENTS

| | | | |
|---|---|---|---|
| 1,689,150 | 10/1928 | Mensch | 292/303 |
| 2,621,357 | 12/1952 | Stuman | 292/303 X |
| 4,252,351 | 2/1981 | Yoshino et al. | 292/201 X |

*Primary Examiner*—Richard E. Moore

[57] ABSTRACT

The assembly comprises a latch case (1) and a locking actuator (2), said case (1) and said actuator (2) comprising complementary anchoring means (7) capable of occupying two positions, namely a position permitting the placing in position or withdrawal of the actuator relative to the case and a position in which the actuator is retained on the case, and complementary elastically-engaged locking means (8) for locking the anchoring means in the retained position.

4 Claims, 3 Drawing Figures

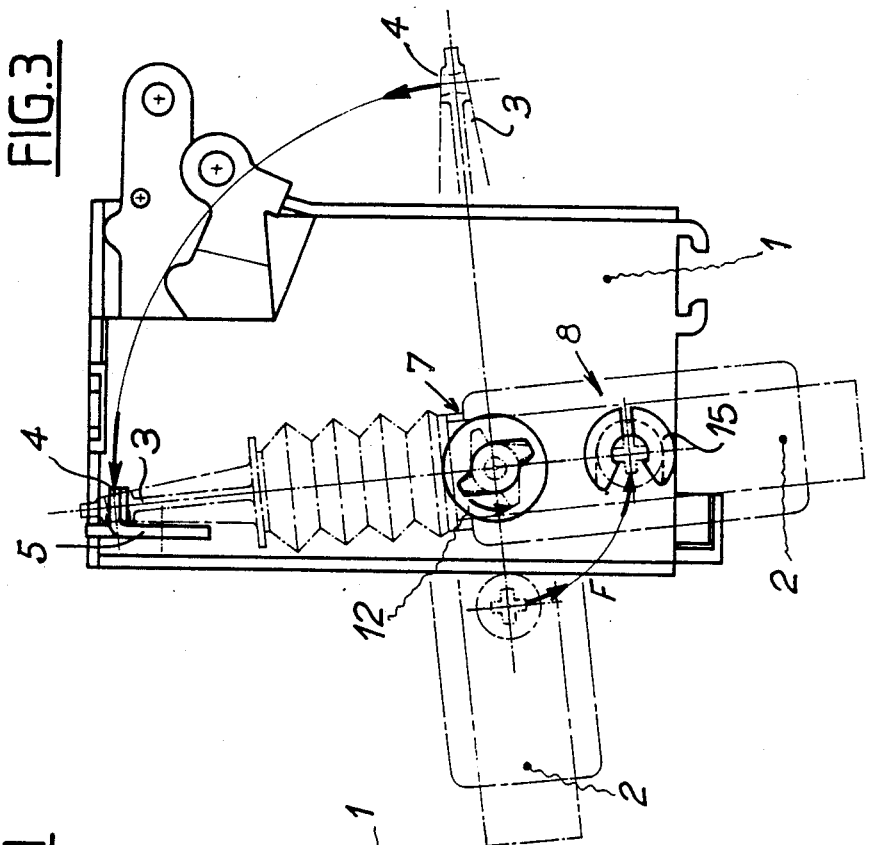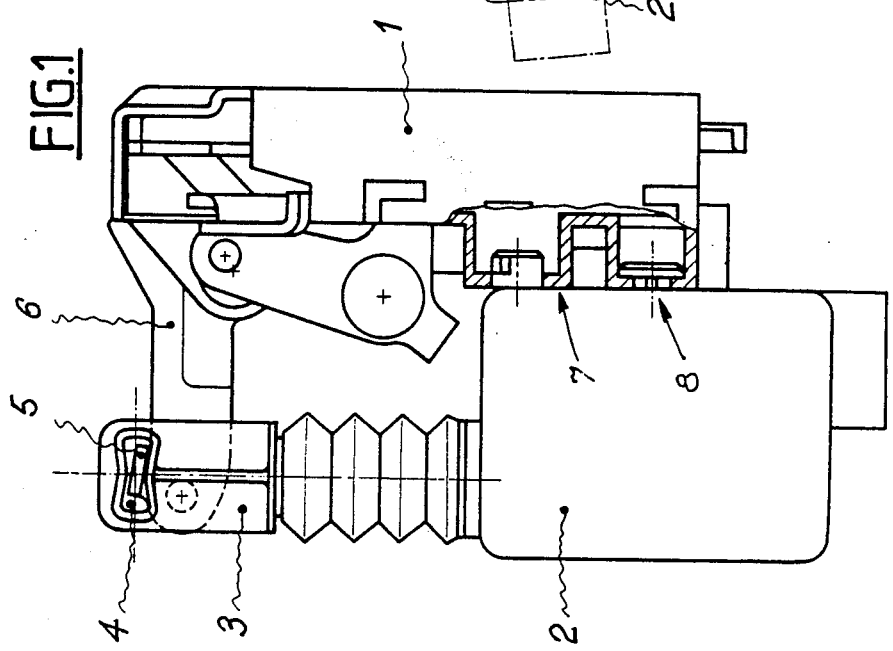

DOOR LATCH ASSEMBLY, IN PARTICULAR FOR AN AUTOMOBILE VEHICLE

The present invention relates to a door latch assembly, in particular of an automobile vehicle, of the type comprising a latch case and a locking actuator.

More particularly, the invention concerns the fixing of the actuator on the latch case.

In the art, the locking actuator is fixed by one or several self-tapping screws either on the inner panel of the door or directly on the latch plate through the medium of a member fixed to this plate by welding or riveting.

This type of fixing has a number of drawbacks, in particular in respect of the time required to assemble such an assembly.

Indeed, this type of fixing imposes the use of tools, for example for the riveting of the member on the latch plate, and for the screwing or unscrewing of the means for fixing the actuator on the plate or on the door panel.

For these reasons, in the case of a mounting of the actuator on the latch plate, this is effected by the latch manufacturer, and not upon the mounting of this latch assembly on the vehicle by the automobile constructor.

On the other hand, in the case of an actuator directly fixed on the inner panel of the door, its mounting is effected by the automobile constructor, but the time required for the mounting is added to that of the latch itself.

Now, for various reasons, it is of interest to arrange that the mounting of the actuator on the latch be capable of being effected by the automobile manufacturer.

An object of the invention is to solve the problems mentioned hereinbefore by providing a door latch assembly with an actuator, in which the latch case and the actuator can be very rapidly assembled without the aid of accessory tools.

The invention therefore provides a door latch assembly, in particular for an automobile vehicle, of the type comprising a latch case and a locking actuator, wherein said case and said actuator comprise complementary anchoring means capable of occupying two positions, one position permitting the positioning or the withdrawal of the actuator relative to the case, and the other position permitting the retention of said actuator on said case, and elastically engaged complementary locking means for locking said anchoring means in the retaining position.

A better understanding of the invention will be had from the following description which is given solely by way of example with reference to the accompanying drawings, in which:

FIG. 1 is a view of a door latch assembly according to the invention;

FIG. 3 is a view of a door latch assembly in which an actuator is shown in the introduction or withdrawing position and in the position in which it is retained on a latch case.

Figure 2:
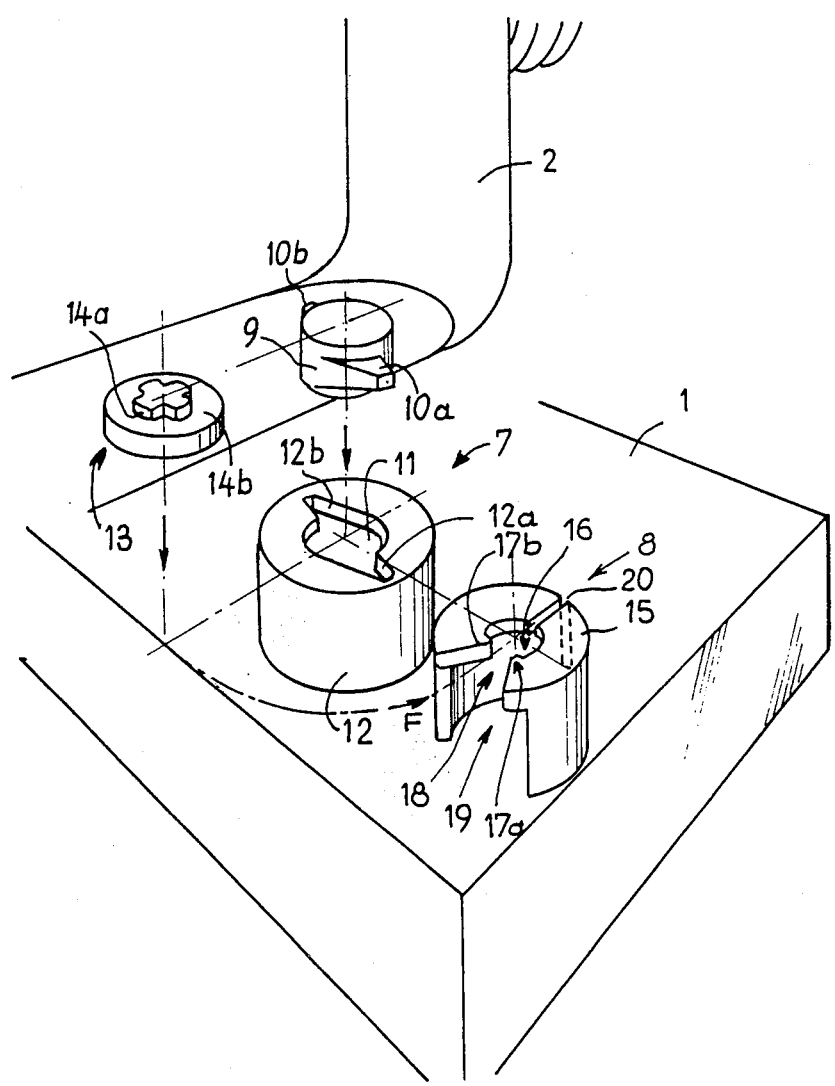
FIG. 2 is a perspective view to an enlarged scale of the anchoring means and the elastically engaged locking means which are part of the construction of an assembly according to the invention.

As can be seen in FIG. 1, a door latch assembly, in particular of an automobile vehicle, comprises a latch case 1 having a generally rectangular box configuration and a cavity therein on which is mounted a locking actuator 2 including a carriage 3 having an elastic portion for engaging the locking means 8. One end of this carriage has a cavity 4 and is engaged with a tab 5 of a crank lever 6 for locking the latch.

The actuator 2 is secured to the latch case 1 by anchoring means generally designated by the reference numeral 7 and by elastically-engaged locking means generally designated by the reference numeral 8 which is attached to the elastic portion of carriage 3.

As can be seen more particular in FIG. 2, the anchoring means 7 are constituted by a first stud 9 integral with the actuator 2, this stud having wings 10a and 10b disposed on each side of the stud. This first stud and these wings are adapted to be introduced into a cavity 11 provided in the upper wall of a hollow first boss 12 integral with the latch case 1. The hollow first boss 12 is of generally cylindrical construction and has an upper surface which is generally circular, the boss projecting above the upper wall of the latch casing and the circular top of the casing having an opening for actuating the first stud with wings so that the stud may be held by the upper wall of the boss. This cavity 11 in the first boss 12 has recesses 12a and 12b of a shape complementary to that of the wings 10a and 10b of the stud 9 so as to permit the introduction of the latter into the cavity.

The elastically-engaged locking means 8 comprise a second stud 13 integral with the actuator 2 and having a first portion 14a whose section is advantageously in the shape of a cross inscribed in a circle, and a second portion 14b in the form of a washer which may advantageously be in one piece with the first portion. This stud 13 is adapted to engage in a second hollow boss 15 of the latch case 1, said second boss 15 having a generally cylindrical shape and being formed with an opening at the top for receiving stud 13. More particularly, the portion 14a of the stud 13 is adapted to be introduced into a cavity 16 formed for this purpose in the upper wall of the boss 15, this cavity having lips 17a and 17b separated by a distance less than the diameter of the cavity 16 and therefore of the circle in which the cross-shaped section of the portion 14a of the stud 13 is inscribed, these lips being divergent toward the periphery of the boss 15 so as to constitute a first radial opening 18 for the passage of the portion 14a of the stud 13.

The portion 14b of this stud enters the interior of the boss 15 through a second radial opening 19 formed in this boss below the first opening 18.

Further, this boss 15 includes a radial slot 20 provided in facing relation to the first radial opening 18 and imparting resilience to the upper part of this boss and more particularly allowing the lips 17a and 17b to slightly spread apart upon the passage of the portion 14e of the stud 13 so as to facilitate its introduction into the cavity 16.

The actuator is placed in position in the following manner (FIGS. 2 and 3). The actuator 2 is presented above the latch case with the stud 9 above the opening 11 of the boss 12 so that the wings 10a and 10b of the stud can be introduced into the recesses 12a and 12b of the boss. The actuator is then oriented substantially to a position perpendicular to its final position, as can be seen in FIG. 3. The stud 9 is then engaged in the boss 12 and the actuator is angularly shifted in the direction indicated by the arrow F so that the wings 10a and 10b of the stud 9 become cooperative with the solid portions of the boss 12 and ensure the anchoring of the actuator 2 on the latch case.

If this pivoting movement is continued, the portions 14a and 14b of the stud 13 are respectively engaged in the first opening 18 and in the second opening 19 of the boss 15, the portion 14a spreading apart the lips of the first opening so as to be introduced into the cavity 16. This pivoting also brings the end of the carriage 3, and more particularly the cavity 4 provided in the latter, into engagement with the tab 5 of the locking crank lever.

Thus, the actuator is placed in position on the latch case without the use of accessory tools. However, the dismantling of the actuator requires the intervention of a tool, such as for example a screw-driver, which is introduced into the slot 20 of the boss 15 so as to open the latter slightly and separate the lips 17a and 17b and thereby release the stud 13 integral with the actuator so that it is then possible to pivot the actuator in the direction opposed to that of the mounting, so as to bring the wings 10a and 10b of the stud 9 of the actuator back to alignment with the recesses 12a and 12b of the cavity 11 of the boss 12 of the latch case and thus permit the withdrawal of the actuator.

This enables possibly replacing the actuator while avoiding an accidental unlocking of the latter.

What is claimed is:

1. A door latch assembly for an automobile vehicle comprising:
   a latch cover having a rectangular box configuration and an upper wall having a cavity in said latch cover and said latch cover being constructed to provide a plurality of hollow boss means projecting above said upper wall and fixed to said upper wall;
   a locking actuator mounted on said latch cover;
   anchoring means securing said locking actuator to a corner of the upper face of said latch cover;
   said locking actuator including a carriage having an elastic portion;
   a crank lever including a tab located in the cavity of said latch cover adapted for pivotal movement in the corner below the upper wall of said latch cover;
   a first stud integral with said locking actuator having a circular center portion and wings on each side of said center portion, said wings and circular center portion being adapted to be introduced into the opening at the top wall of said first boss;
   a second stud integral with said actuator having a center portion and wings adapted to be fitted through the top wall of said second boss;
   a plurality of cylindrically shaped boss means comprising a first hollow boss means secured to the upper wall of said latch cover, said first boss means having a top wall with an opening to receive said first stud and wings of said anchoring means and a second hollow boss means secured to the upper wall of said latch casing which is located below said first hollow boss means on said upper wall of said latch casing to receive a locking means;
   said actuator being adapted to introduce said first stud into said first boss permitting the anchoring means to be placed in locked position and to introduce said second stud into said second boss by an angular movement of said actuator to the locking member, so that in one position the actuator can be withdrawn from said latch cover and in another position the actuator may be retained on said latch cover whereby in the locked position the actuator is retained on said cover.

2. A door latch assembly as claimed in claim 1 wherein the upper wall of said first boss includes means for retaining said first stud within the cavity of said first boss.

3. A door latch assembly as claimed in claim 1 wherein the upper wall of said second boss includes means for retaining said second stud in the cavity of said second boss.

4. A door latch assembly as claimed in claim 1 wherein said opening of said second boss comprises a first and a second radial opening, the second opening being below the first and wherein said second stud further includes a portion of the shape of a washer which is adapted to engage in the second radial opening.

* * * * *